Jan. 12, 1932.  G. E. NERNEY  1,840,787
EYEGLASS CONSTRUCTION
Filed Nov. 23, 1929
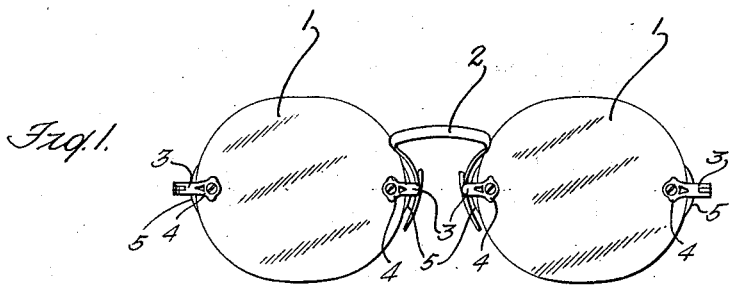
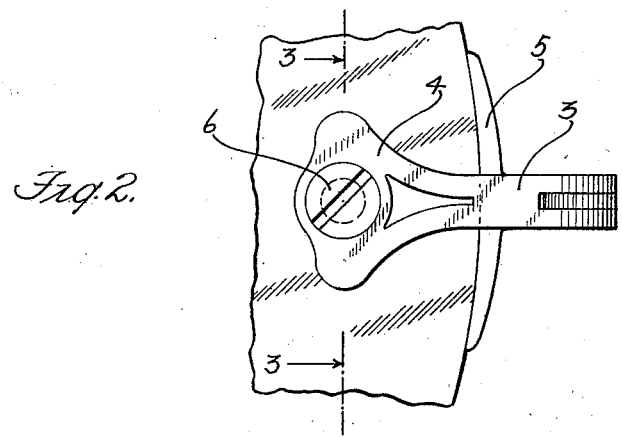
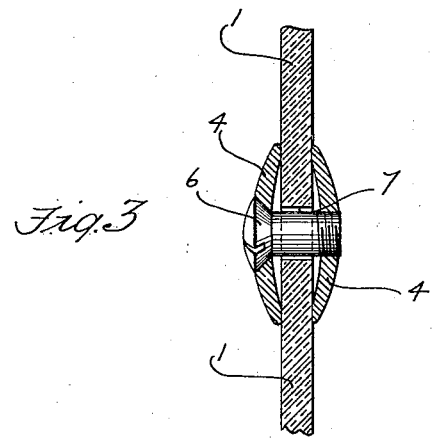
INVENTOR
George E. Nerney
BY
Janney, Blair & Curtis
ATTORNEYS Patented Jan. 12, 1932

1,840,787

UNITED STATES PATENT OFFICE

GEORGE E. NERNEY, OF ATTLEBORO, MASSACHUSETTS, ASSIGNOR TO BAY STATE OPTICAL COMPANY, A CORPORATION OF MAINE

EYEGLASS CONSTRUCTION

Application filed November 23, 1929. Serial No. 409,203.

This invention relates to eyeglass constructions and particularly to mountings for eyeglass lenses.

Among other objects, the invention is intended to provide a mounting for rimless lenses which is strong and durable and which is so constructed and arranged as to provide a secure attachment to the lens, without unduly weakening the lens at or adjacent the point of attachment. Other objects will be in part obvious and in part pointed out hereinafter.

The invention accordingly consists in the features of construction, combinations of elements and arrangements of parts which will be exemplified in the construction hereinafter described, and the scope of the application of which will be indicated in the subjoined claims.

In the accompanying drawings in which is shown one of the various possible embodiments of the invention:—

Fig. 1 is a front elevation of an eyeglass construction embodying the invention.

Fig. 2 is an enlarged view of a portion of a lens and one of the mountings secured thereto.

Fig. 3 is a sectional view taken on the line 3—3 of Fig. 2.

As conducive to a clear understanding of certain features of the invention, it might at this point be noted that, heretofore, rimless lenses have been mounted between two extensions or ears and secured thereto by a screw which passed through a hole in the lens and clamped the two ears to the lens. In such prior mountings the ears were rigid, lay flat on the lens, and contacted with and were pressed against the lens adjacent the hole in the lens. Such a construction had a tendency under strain to break the lens adjacent the hole. In the present invention the ears engage the lens at points relatively remote from the hole in the lens, thereby relieving the lens of strain adjacent the attachment hole and reducing the possibility of breakage at said point.

The rimless eyeglass selected for illustration comprises two lenses 1, a bridge 2, and mountings for the lenses. Each mounting consists of a body portion 3, to which the bridge 2 or a side extension may be attached, and two ears 4 formed as extensions of the body portion 3 and spaced apart to receive between them the lens 1. Secured to and extending from either side of body portion 3, a member 5 may be provide to engage and support the rim of the lens adjacent the body portion 3.

As best shown in Fig. 3, the ears 4 are preferably arc-shaped in cross-section and positioned with the extremities of the arc in contact with the lens. Ears 4 are securely clamped to the lens by a screw 6 which passes through a hole 7 provided in the lens 1. The whole mounting is preferably made of metal, and the arc-shaped ears 4 are preferably (but not essentially) thin enough a flex slightly under the tightening action of the screw 6 or under strains, thus producing a springlike action between the ears 4 and the lens 1. Such action tends to keep an even tension on the threads of the screw and thus avoid any tendency of the screw to loosen.

It will be noted that the extremities of the arcs of ears 4 contact with the lens 1 at points relatively remote from the hole 7, thus relieving the lens of pressure adjacent the hole and increasing the holding power of the attachment. Because of the spaced relationship of the points of contact between the lens and the extremities of the ears, a substantial area of the lens is covered by the ears, and the effective leverage from the rim of the lens to the point of contact between the lens and the ears is less than in prior constructions, thus further protecting the lens against breakage at the attachment point.

The slight flexibility of the arc-shaped ears (when provided) produces a springlike contact between the ears and the lens which has a tendency to permit slight relative movement between the ears and the lens, under strains, and thereby relieve the lens of pressures which otherwise might be destructive.

It will be seen that there is provided a construction of an essentially practical nature in which the several objects of this invention are attained.

As many other embodiments may be made without departing from the scope of this invention, it is to be understood that all matter herein set forth or shown in the accompanying drawings is to be interpreted as illustrative and not in a limiting sense.

I claim:

1. In eyeglass construction, in combination, a body portion having spaced ears to receive a lens therebetween, a lens extending between said ears and having a hole therein, said ears having extensions directed toward and engaging portions of the lens lying on opposite sides of the hole therein at points relatively remote therefrom, said extensions being substantially arc-shaped and resilient, and means passing through the hole in the lens for drawing said ears toward each other and for causing said extensions yieldably to grip said portions of said lens.

2. In eyeglass construction, in combination, a lens having a hole therein, a lens mounting, said mounting including means adapted to engage said lens on one side of said hole and a bridging resilient member on the other side of said lens and extending over said hole, said bridging member having its end portions engaging portions of the lens relatively remote from said hole, and means passing through said hole for drawing said yieldable bridging member toward said means.

3. In eyeglass construction, in combination, a lens having a hole therein, a lens mounting, said mounting including means adapted to engage said lens on one side of said hole, and a bridging resilient sheet metal member extending over said hole on the other side of said lens and being elongated and curved to engage by its ends portions of the lens relatively remote from said hole, and means passing through said hole for drawing said elongated member toward said means.

4. In eyeglass construction, in combination, a lens having a hole therein, a lens mounting, said mounting including two spaced clamping members between which said lens is received, said clamping members being resilient and arc-shaped to extend over the hole in the lens and contacting only at their ends with portions of the lens relatively remote from the hole therein, and a screw passing through said hole for determining the spring pressure with which said members grip said remote portions of the lens.

5. In eyeglass construction, in combination, a lens having a hole therein, a lens mounting, said mounting including a member extending in a direction away from said lens and having two spaced clamping members between which said lens is received so that said clamping members extend over said hole, said clamping members having resilient portions extending in a direction substantially at right angles to the direction in which said mounting member extends, and means passing through said hole for drawing said clamping members toward one another, said resilient portions adapted to yield upon relative twisting between said mounting and said lens about an axis extending in the direction in which said mounting member extends.

In testimony whereof, I have signed my name to this specification this 16th day of November, 1929.

GEORGE E. NERNEY.